United States Patent
McMurtry et al.

(10) Patent No.: US 10,399,145 B2
(45) Date of Patent: Sep. 3, 2019

(54) ADDITIVE MANUFACTURING APPARATUS AND METHOD

(71) Applicant: RENISHAW PLC, Wotton-under-Edge, Gloucestershire (GB)

(72) Inventors: David Roberts McMurtry, Stancombe (GB); Geoffrey McFarland, Wickwar (GB); Nicholas John Weston, Peebles (GB); Ben Ian Ferrar, Stoke-on-Trent (GB)

(73) Assignee: RENISHAW PLC, Wotton-under-Edge (GB)

( * ) Notice: Subject to any disclaimer, the term of this patent is extended or adjusted under 35 U.S.C. 154(b) by 331 days.

(21) Appl. No.: 14/897,152

(22) PCT Filed: Jun. 11, 2014

(86) PCT No.: PCT/GB2014/051791
§ 371 (c)(1),
(2) Date: Dec. 9, 2015

(87) PCT Pub. No.: WO2014/199149
PCT Pub. Date: Dec. 18, 2014

(65) Prior Publication Data
US 2016/0136730 A1  May 19, 2016

(30) Foreign Application Priority Data

Jun. 11, 2013 (GB) .................................. 1310398.1

(51) Int. Cl.
*B22F 3/105* (2006.01)
*B29C 64/386* (2017.01)
(Continued)

(52) U.S. Cl.
CPC .......... *B22F 3/1055* (2013.01); *B29C 64/153* (2017.08); *B29C 64/386* (2017.08);
(Continued)

(58) Field of Classification Search
None
See application file for complete search history.

(56) References Cited

U.S. PATENT DOCUMENTS

| | | | |
|---|---|---|---|
| 4,863,538 | A | 9/1989 | Deckard |
| 5,017,317 | A | 5/1991 | Marcus |

(Continued)

FOREIGN PATENT DOCUMENTS

| | | | |
|---|---|---|---|
| CN | 101835554 A | 9/2010 | |
| CN | 102328081 A | 1/2012 | |

(Continued)

OTHER PUBLICATIONS

Aug. 4, 2014 International Search Report issued in International Patent Application No. PCT/GB2014/051775.

(Continued)

*Primary Examiner* — Jacob T Minskey
*Assistant Examiner* — Baileigh Kate Darnell
(74) *Attorney, Agent, or Firm* — Oliff PLC

(57) ABSTRACT

An additive manufacturing apparatus for building objects by layerwise consolidation of material. The apparatus includes a build chamber containing a working area, a plurality of high energy beams for consolidating material deposited in the working area in layers and an optical unit for controlling transmission of the high energy beams onto material in the working area. The optical unit includes a plurality of independently controllable optical elements each optical element for controlling transmission of at least one of the high energy beams onto the material in the working area, the optical unit movable in the build chamber.

23 Claims, 13 Drawing Sheets

(51) Int. Cl.
  *B33Y 30/00* (2015.01)
  *B33Y 50/02* (2015.01)
  *G02B 26/02* (2006.01)
  *G02B 26/10* (2006.01)
  *B29C 64/153* (2017.01)
  *B33Y 40/00* (2015.01)

(52) U.S. Cl.
  CPC ........... *G02B 26/02* (2013.01); *G02B 26/101* (2013.01); *B22F 2003/1056* (2013.01); *B22F 2003/1057* (2013.01); *B22F 2003/1059* (2013.01); *B33Y 30/00* (2014.12); *B33Y 40/00* (2014.12); *B33Y 50/02* (2014.12); *Y02P 10/295* (2015.11)

(56) References Cited

U.S. PATENT DOCUMENTS

| | | |
|---|---|---|
| 5,089,185 A | 2/1992 | Hirano et al. |
| 5,155,324 A | 10/1992 | Deckard et al. |
| 5,316,580 A | 5/1994 | Deckard |
| 5,352,405 A | 10/1994 | Beaman et al. |
| 5,427,733 A | 6/1995 | Benda et al. |
| 5,534,104 A | 7/1996 | Langer et al. |
| 5,536,467 A | 7/1996 | Reichle et al. |
| 5,730,925 A | 3/1998 | Mattes et al. |
| 5,753,171 A | 5/1998 | Serbin et al. |
| 5,786,562 A | 7/1998 | Larson |
| 5,846,370 A | 12/1998 | O'Connor |
| 5,985,204 A | 11/1999 | Otsuka et al. |
| 6,197,575 B1 | 3/2001 | Griffith et al. |
| 6,215,093 B1 | 4/2001 | Meiners et al. |
| 6,391,251 B1 | 5/2002 | Keicher et al. |
| 6,534,740 B1 | 3/2003 | Meiners et al. |
| 6,554,600 B1 | 4/2003 | Hofmann et al. |
| 6,583,379 B1 | 6/2003 | Meiners et al. |
| 6,621,039 B2 | 9/2003 | Wang et al. |
| 7,047,098 B2 | 5/2006 | Lindemann et al. |
| 7,204,684 B2 | 4/2007 | Ederer et al. |
| 7,874,445 B2 | 1/2011 | Hochsmann et al. |
| 7,976,302 B2 | 7/2011 | Halder et al. |
| 8,282,377 B2* | 10/2012 | Higashi ............... B29C 67/0077 264/113 |
| 8,753,105 B2 | 6/2014 | Scott |
| 9,114,478 B2* | 8/2015 | Scott .................... B23K 26/703 |
| 2002/0090313 A1 | 7/2002 | Wang et al. |
| 2002/0105114 A1* | 8/2002 | Kubo .................... B29C 64/153 264/497 |
| 2002/0152002 A1 | 10/2002 | Lindemann et al. |
| 2003/0206820 A1 | 11/2003 | Keicher et al. |
| 2004/0045941 A1 | 3/2004 | Herzog et al. |
| 2004/0094728 A1 | 5/2004 | Herzog et al. |
| 2004/0099996 A1 | 5/2004 | Herzog |
| 2005/0116391 A1 | 6/2005 | Lindemann et al. |
| 2005/0142024 A1 | 6/2005 | Herzog |
| 2005/0179772 A1* | 8/2005 | Ishikawa ............ B23K 26/0604 347/255 |
| 2006/0048706 A1 | 3/2006 | Cheong et al. |
| 2006/0141089 A1 | 6/2006 | Larsson et al. |
| 2006/0219315 A1 | 10/2006 | Cox |
| 2006/0219671 A1 | 10/2006 | Merot et al. |
| 2007/0001342 A1 | 1/2007 | Oberhofer et al. |
| 2007/0037037 A1 | 2/2007 | Nguyen et al. |
| 2007/0057412 A1 | 3/2007 | Weiskopf et al. |
| 2007/0126157 A1 | 6/2007 | Bredt |
| 2008/0131540 A1 | 6/2008 | Perret et al. |
| 2008/0190905 A1 | 8/2008 | Heinlein |
| 2008/0241392 A1 | 10/2008 | Dimter et al. |
| 2009/0017220 A1 | 1/2009 | Muller et al. |
| 2009/0206065 A1 | 8/2009 | Kruth et al. |
| 2009/0266803 A1 | 10/2009 | Perret et al. |
| 2009/0291308 A1 | 11/2009 | Pfister et al. |
| 2010/0043698 A1 | 2/2010 | Bolt |
| 2010/0233012 A1* | 9/2010 | Higashi ................ B22F 3/1055 419/9 |
| 2011/0061591 A1* | 3/2011 | Stecker ................ B22F 3/1055 118/663 |
| 2011/0135840 A1 | 6/2011 | Doye et al. |
| 2011/0285060 A1 | 11/2011 | Yamamoto et al. |
| 2011/0291331 A1 | 12/2011 | Scott |
| 2012/0126457 A1* | 5/2012 | Abe ...................... B22F 3/1055 264/460 |
| 2012/0251378 A1 | 10/2012 | Abe et al. |
| 2013/0112672 A1 | 5/2013 | Keremes et al. |
| 2013/0270750 A1* | 10/2013 | Green ................... B22F 3/1055 264/497 |
| 2014/0252687 A1 | 9/2014 | El-Dasher et al. |
| 2014/0263209 A1 | 9/2014 | Burris et al. |
| 2014/0271965 A1 | 9/2014 | Ferrar |
| 2014/0348691 A1* | 11/2014 | Ljungblad ............. B22F 3/1055 419/53 |
| 2015/0158111 A1 | 6/2015 | Schwarze et al. |
| 2015/0174827 A1 | 6/2015 | Schwarze et al. |
| 2015/0210013 A1 | 7/2015 | Teulet |
| 2016/0136730 A1 | 5/2016 | McMurtry et al. |

FOREIGN PATENT DOCUMENTS

| | | |
|---|---|---|
| CN | 102438779 A | 5/2012 |
| DE | 4302418 A1 | 8/1994 |
| DE | 19953000 A1 | 5/2001 |
| DE | 102005014483 A1 | 10/2006 |
| EP | 0 406 513 A1 | 1/1991 |
| EP | 1 441 897 B1 | 8/2006 |
| EP | 2 221 132 A1 | 8/2010 |
| EP | 1 993 812 B1 | 7/2011 |
| EP | 2431113 A1 | 3/2012 |
| EP | 2 565 294 A1 | 3/2013 |
| JP | H4-113828 A | 4/1992 |
| JP | H11-05254 A | 1/1999 |
| JP | 2000/263650 A | 9/2000 |
| JP | 2002/144437 A | 5/2002 |
| JP | 2004-514053 A | 5/2004 |
| JP | 2005/089863 A | 4/2005 |
| JP | 2009/006509 A | 1/2009 |
| JP | 2009-108348 A | 5/2009 |
| JP | 2009-108350 A | 5/2009 |
| JP | 2011-240713 A | 12/2011 |
| WO | 91/12120 A1 | 8/1991 |
| WO | 92/08592 A1 | 5/1992 |
| WO | 2010/007396 A1 | 1/2010 |
| WO | 2011/064725 A1 | 6/2011 |
| WO | 2013-003457 A1 | 1/2013 |
| WO | 2013/024297 A1 | 2/2013 |
| WO | 2014/180971 A1 | 11/2014 |
| WO | 2015/003804 A1 | 1/2015 |

OTHER PUBLICATIONS

Aug. 4, 2014 Written Opinion issued in International Patent Application No. PCT/GB2014/051775.
Jan. 17, 2014 Search Report issued in British Patent Application No. 1310276.9.
Jul. 2, 2014 Search Report issued in British Patent Application No. 1310398.1.
Sep. 9, 2014 International Search Report issued in International Patent Application No. PCT/GB2014/051791.
Sep. 9, 2014 Written Opinion issued in International Patent Application No. PCT/GB2014/051791.
U.S. Appl. No. 14/896,161 filed Dec. 4, 2015 in the name of Ferrar et al.
Wilkening, Christian "Fast production of Technical Prototypes Using Direct Laser Sintering of Metals and Foundry Sand", EOS GMBH. pp. 133-140.
Dec. 7, 2016 Chinese Office Action issued in Chinese Patent Application No. 201480046346.3.
Oct. 27, 2016 Office Action issued in Chinese Patent Application No. 201480044241.4.
Sep. 5, 2017 Office Action issued in Chinese Application No. 201480044241.4.

(56) References Cited

OTHER PUBLICATIONS

Jun. 19, 2018 Office Action issued in Japanese Patent Application No. 2016-518583.
Oct. 9, 2018 Office Action Issued in U.S. Appl. No. 14/896,161.
Jul. 24, 2018 Office Action issued in Japanese Patent Application No. 2016-518582.
Nov. 15, 2018 Extended Search Report issued in European Patent Application No. 18187563.4.
Jan. 8, 2019 Office Action issued in Japanese Patent Application No. 2016-518583.
Nov. 5, 2018 Office Action issued in Chinese Patent Application No. 201480044241.4.

* cited by examiner

ADDITIVE MANUFACTURING APPARATUS AND METHOD

SUMMARY OF INVENTION

This invention concerns an additive manufacturing apparatus and method. The invention has particular, but not exclusive, application to scanning multiple lasers across a powder bed.

BACKGROUND

Additive manufacturing or rapid prototyping methods for producing objects comprise layer-by-layer solidification of a material, such as a metal powder material, using a high energy beam, such as a laser beam or electron beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

During the melting or sintering process, debris (e.g. condensate, unsolidified particles of powder etc) is produced within the build chamber. It is known to introduce a gas flow through the build chamber in an attempt to remove debris from the chamber in the gas flow. For example, the M280 model of machine produced by EOS GmbH, Munich, Germany comprises a series of gas outlet nozzles located in the build chamber to the rear of the powder bed that pass a flow of gas to a series of exhaust vents that are located in the build chamber at the front of the powder bed. In this manner, a planar layer of gas flow is created at the surface of the powder bed. A similar arrangement is provided in Renishaw's AM250 and AM125 machines, wherein apertures in the build chamber either side of a powder bed provide substantially planar gas flow across the powder bed.

It is known from DE102005014483 A1 to use four laser beams to scan a powder bed, each laser beam solidifying powder in a different quadrant of the powder bed. Such an arrangement may increase build speed because different parts of an object or different objects located in different quadrants can be built simultaneously with different laser beams.

US2013/0112672 discloses an additive manufacturing assembly in which a primary energy beam is split into a plurality of secondary laser beams. The secondary beams are directed by individually movable energy directing elements into separate regions of a workspace. A transit assembly may be provided for conveying energy transmitting devices, the transit assembly comprising a first carriage movable in a first direction and a second carriage that moves on the first carriage in a second direction. Each of the energy transmitting devices emits a separate laser beam that is independently and separately movable for directing energy over separate portions of the part.

SUMMARY OF INVENTION

According to a first aspect of the invention there is provided an additive manufacturing apparatus for building objects by layerwise consolidation of material, the apparatus comprising a build chamber containing a working area, a plurality of high energy beams for consolidating material deposited in the working area in layers and an optical unit for controlling transmission of the high energy beams onto material in the working area, the optical unit comprising a plurality of independently controllable optical elements, each optical element for controlling transmission of at least one of the high energy beams onto the material in the working area, the optical unit movable in the build chamber.

Each optical element may be arranged to steer the at least one laser beam onto material in the working area in a different direction to that/those in which the optical unit is arranged to move. The different direction may be perpendicular to a direction in which the optical unit is arranged to move. The optical unit may be arranged to move in either direction along a linear axis. Each optical element may be arranged to only steer the at least one laser beam in a direction perpendicular to the linear axis.

The additive manufacturing apparatus may comprise a control unit for controlling movement of the optical unit and optical elements such that movement of the laser beam during consolidation of the material is achieved by simultaneous movement of the optical unit and optical elements.

Each optical element may be arranged to steer the at least one laser beam in only one-dimension.

Each optical element may be arranged such that movement of the optical element can move a spot of the at least one laser beam across the working surface faster than the spot can be moved across the working surface by moving the optical unit.

The plurality of optical elements may be arranged to direct the laser beams such that, for a position of the optical unit, an entire width of the working area can be scanned by steering the laser beams with the optical elements.

Each optical element may be mounted to rotate about a rotational axis, the rotational axes fixed relative to each other and the optical unit, wherein for a position of the optical unit, an entire width of the working area can be scanned by steering the laser beams by rotation of the optical elements.

The optical unit may comprise at least one laser for generating at least one of the laser beams, the laser movable with the optical unit.

A scanning zone for each optical element may be defined by a zone over which a laser beam can be directed by the independent movement of the optical element, the optical elements arranged in the optical unit such that, for a position of the optical unit, the scanning zones for at least two of the optical elements overlap.

The apparatus may comprise a control unit for selecting which one of the optical elements to use to form an area of the object located within a region in which the scanning zones overlap.

Each optical element may be removably mounted on the optical unit such that the optical element can be removed from the optical unit separately from another one of the optical elements.

Each optical element may be removably mounted on the optical unit using a kinematic mount.

The movable optical unit may be connected with a gas flow device for generating a gas flow across the working area, the optical unit and gas flow device movable as a single unit.

The optical unit may be connected to a wiper for spreading material across the working area, the optical unit and wiper movable as a single unit.

The optical unit may comprise a two-dimensional array of optical elements.

According to a second aspect of the invention there is provided an optical unit for an additive manufacturing machine in which objects are built by layerwise consolidation of material, the apparatus comprising a build chamber containing a working area, the optical unit comprising a plurality of independently controllable optical elements, the optical unit mountable in a build chamber of the additive manufacturing apparatus to be movable relative to a working area within the build chamber with each optical element arranged for controlling transmission of at least one of a plurality of high energy beams onto material in the working area.

According to a third aspect of the invention there is provided an optical unit for an additive manufacturing machine in which objects are built by layerwise consolidation of material, the apparatus comprising a build chamber containing a working area, the optical unit comprising an optical element mounted within the optical unit so as to rotate about only one axis, the optical unit mountable in a build chamber of the additive manufacturing apparatus to be movable in a linear direction relative to a working area within the build chamber with the optical element arranged for steering a high energy beam onto material in the working area.

It will be understood that the term "scan" used herein is not limited to continuously running a spot of the high energy beam over a surface but includes a series of separated discrete exposures (or hops). For example, optics may direct the high energy beam to expose a first location to the beam, the beam then turned off and the optics reoriented to direct the energy beam to a second location spaced from the first location when the high energy beam is switched back on. The high energy beam is a beam having sufficient energy to consolidate the material.

Preferably, the apparatus is a selective laser solidification, such as melting (SLM) or sintering (SLS), apparatus, wherein powder layers are successively deposited across the working area in the build chamber and a laser beam is scanned across portions of each powder layer that correspond to a cross-section of the object being constructed to consolidate the portions of the powder.

DESCRIPTION OF EMBODIMENTS

Figure 1:
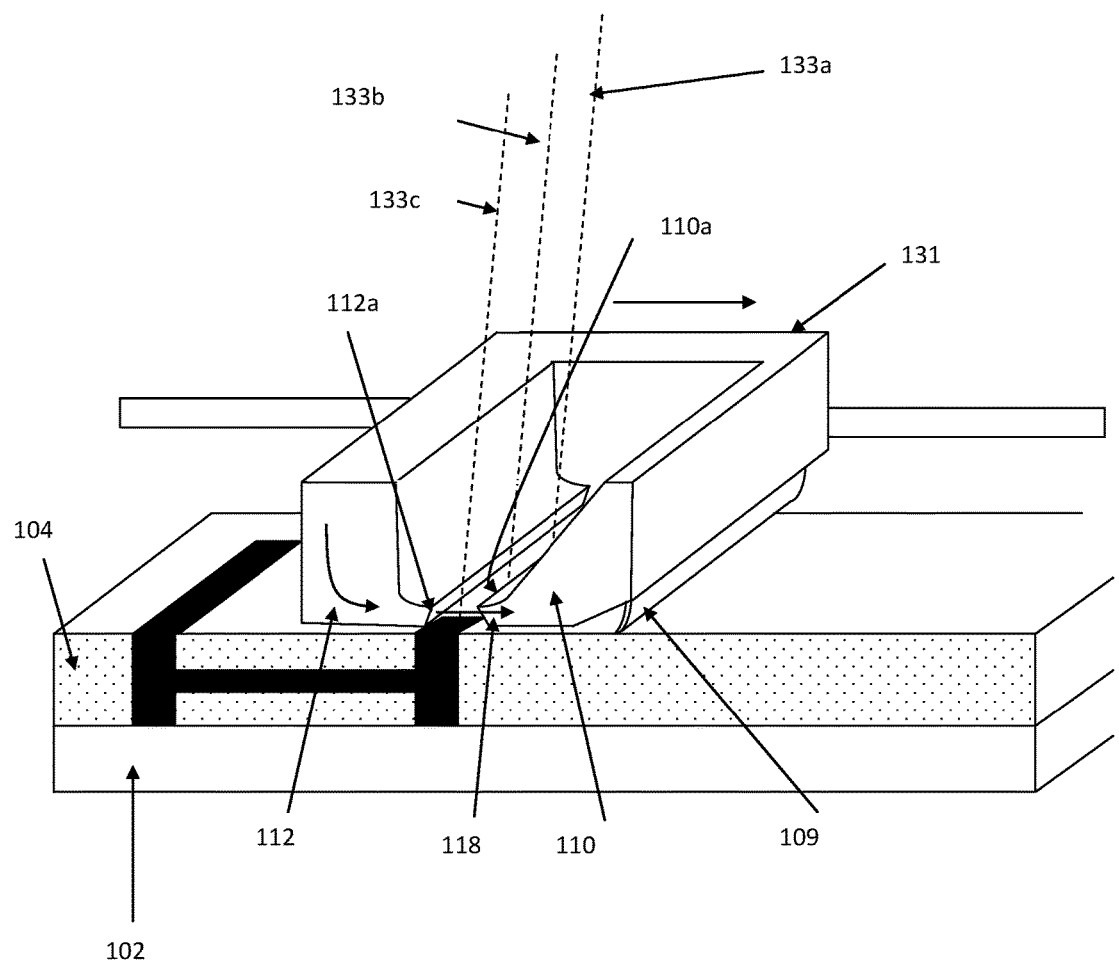
FIGS. 1 to 3 show an additive manufacturing apparatus according to an embodiment of the invention comprising an optical unit for directing multiple laser beams onto the powder bed.
Figure 2:
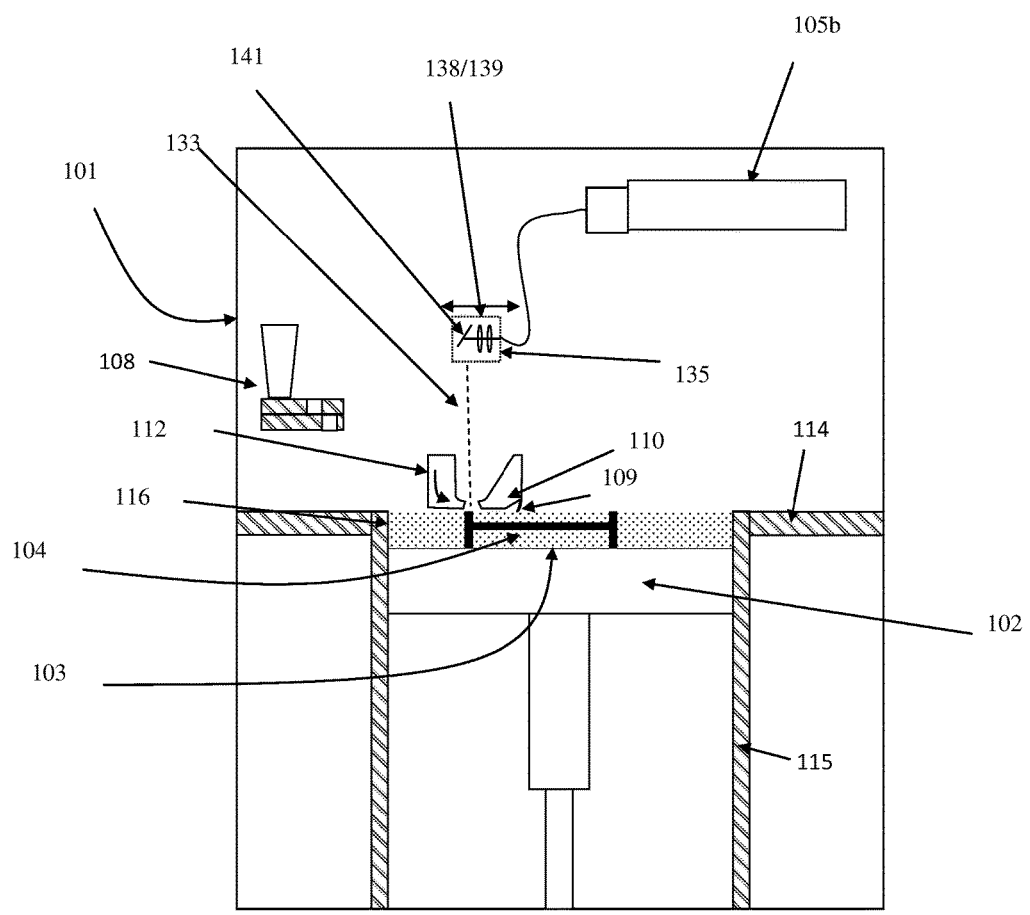
Figure 3:
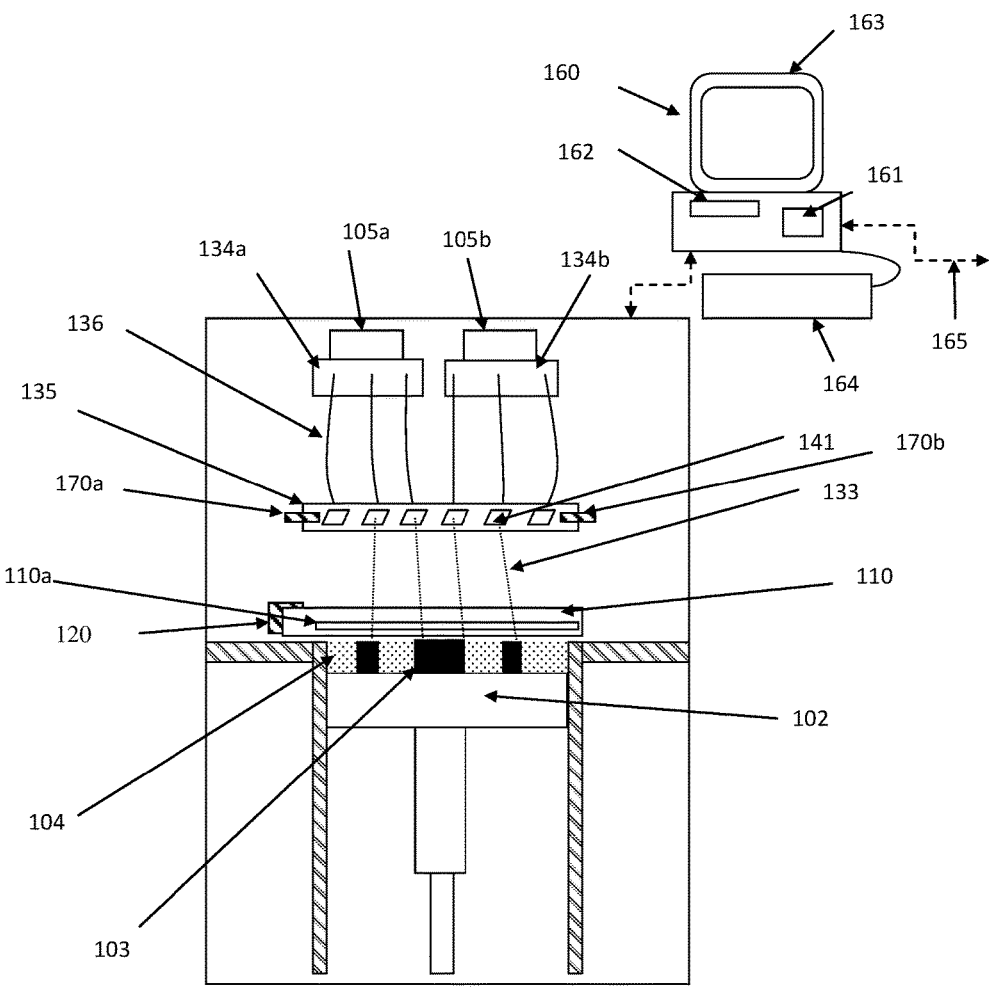

Referring to FIGS. 1 to 3, a laser solidification apparatus according to an embodiment of the invention comprises a build chamber 101 having therein partitions 114, 115 that define a build volume 116 and a surface onto which powder can be deposited. A build platform 102 defines a working area in which an object 103 is built by selective laser melting powder 104. The platform 102 can be lowered within the build volume 116 using a mechanism as successive layers of the object 103 are formed. The build volume 116 available is defined by the extent to which the build platform 102 can be lowered.

The apparatus further comprises a movable gas flow device 131. The gas flow device 131 comprises a nozzle 112 and exhaust 110 formed as a single unit 131 with a fixed distance between a gas inlet 112*a* and a gas outlet 110*a*. A wiper 109 is fixed to the unit 131 and the powder spread across the powder bed 104 simultaneously with movement of the unit 131. The gas nozzle 112 and gas exhaust 110 are for generating a gas flow across a part of the powder bed formed on the build platform 102. The gas inlet 112*a* and gas outlet 110*a* produce a laminar flow having a flow direction from the inlet to the outlet, as indicated by arrows 118. Gas is re-circulated from the exhaust 110 to the nozzle 112 through a gas recirculation loop (not shown) that is also located within the chamber 101. A pump (not shown) maintains the desired gas pressure at gas inlet 112*a* and gas outlet 110*a*. A filter (not shown) is provided in the recirculation loop to filter from the gas condensate that has become entrapped in the flow.

Layers of powder 104 are formed as the object 103 is built by powder dispensing apparatus 108 dosing powder to be spread by wiper 109. For example, the dispensing apparatus 108 may be apparatus as described in WO2010/007396.

The additive manufacturing apparatus is arranged to scan a plurality of laser beams over the powder bed 104. In FIGS. 2 and 3, the primary laser beams from two lasers 105*a*, 105*b* are fed into splitters 134*a* and 134*b*, each splitter dividing the laser beam into three secondary laser beams. These secondary laser beams are fed into a movable optical scanning unit 135 via fibre optical cables 136. The optical scanning unit 135 is for controlling transmission of the secondary laser beams onto material in the powder bed 104. At any one time all or a subset of the secondary laser beams may be used to build the object. (In FIGS. 2 and 3, only four secondary laser beams 133*a*, 133*b*, 133*c*, 133*d* are shown as active in consolidating powder in the powder bed).

The optical scanning unit 135 is mounted to the build chamber 101 on guides 170*a*, 170*b* such that optical scanning unit 135 can move in either direction along one linear axis. The optical scanning unit 135 houses a plurality of separate optical assemblies, each one for steering one of the laser beams onto the powder bed 104.

In this embodiment, each optical assembly comprises focussing optics, such as a pair of movable lenses 138, 139 or an f-theta lens, and a steering optical element, such as a mirror 141 mounted for rotation about an axis. The mirror 141 is arranged to steer the laser beam along a line oriented in a first direction perpendicular to the linear axis of optical unit 135. In this way, the optical unit 135 can carry out 2-dimensional scanning of the powder bed by a combination of linear movement of the optical unit 135 and rotary movement of the mirrors 141. The optical unit 135 and mirrors 141 are arranged such that through the combination of movement the entire powder bed 104 can be scanned. In this embodiment, the mirrors 141 can direct the laser beams over an entire width (first direction) of the powder bed 104 for any one position of the optical unit 135 along the linear axis. Movement of the optical unit 135 along the linear axis allows scanning to extend across the powder bed 104 in the perpendicular direction. In an alternative embodiment, an additional movable mirror may be provided in the optical assembly such that the optical assembly can steer the laser beam over a 2-dimensional area.

Because of the small mass of each mirror 141 relative to the larger mass of the entire optical unit 135 it is expected that movement of a spot of the at least one laser beam across the powder bed in the first direction will be faster than the speed at which the spot can be moved across the powder bed through movement of the optical unit.

In an alternative embodiment, the lasers may be integrated into the optical unit 135.

Computer 160 comprises a processor unit 161, memory 162, display 163, user input device 164, such as a keyboard, touch screen, etc, a data connection to modules of the laser sintering unit, such as optical scanning unit 135 and laser modules 105a, 105b, and an external data connection 165. The laser modules 105a, 105b, optical scanning unit 106, flow device 131 and movement of build platform 102 are controlled by the computer 160.

Figure 4:
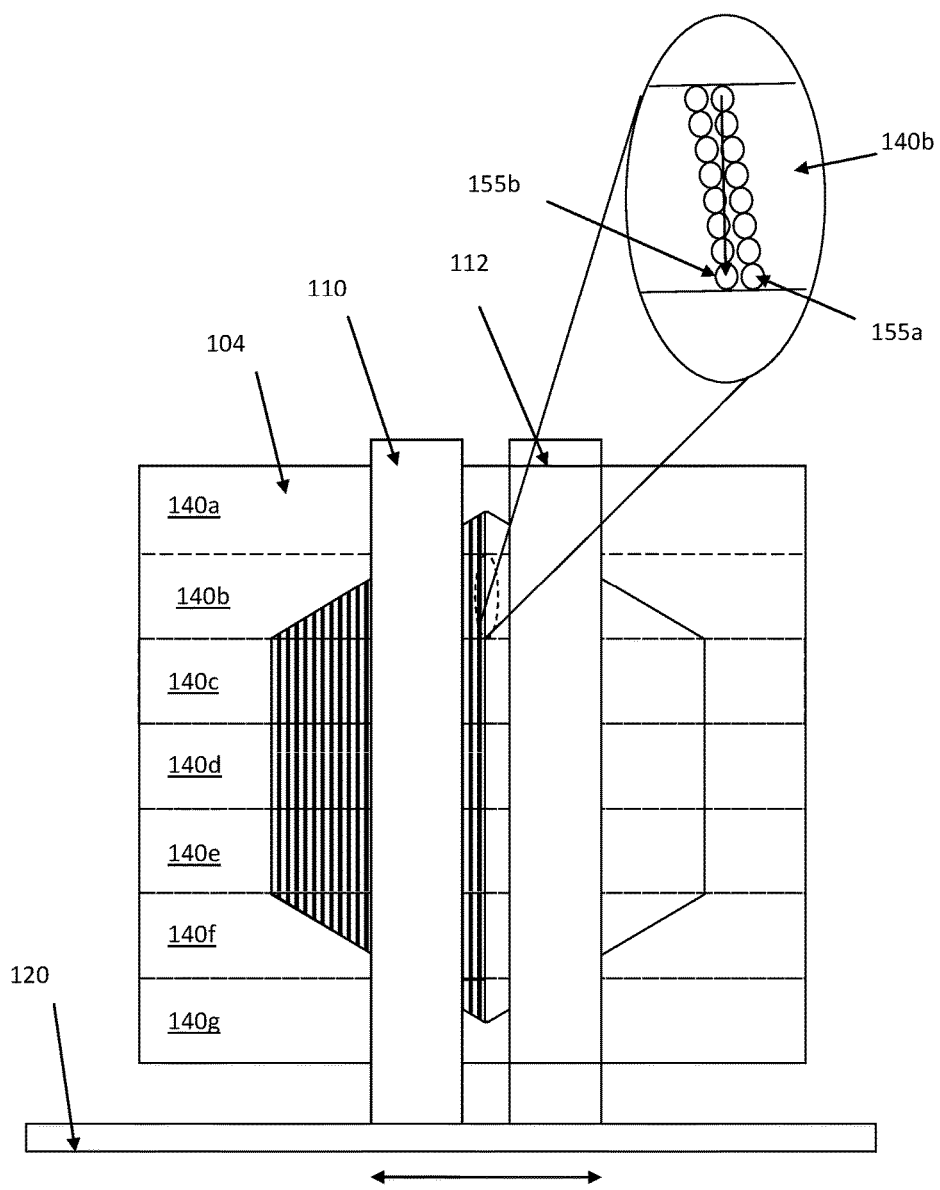
FIG. 4 is a plan view of an object being formed using multiple laser beams in accordance with a method of the invention.

FIG. 4 shows the apparatus being used to scan a powder layer. Each laser can be directed to any point within a scanning zone 140a to 140g. The flow device 131 moves simultaneously with the optical unit 135 such that the laser beams can be directed into the gap between the inlet 112a of the nozzle 112 and the outlet 110a to the exhaust 110. The splitters 134 or optical assemblies each comprise devices 137 for diverting each secondary laser beam after splitting into a heat dump such that the beam can be turned "off" when the laser beam is not required. Accordingly, during scanning, the laser beams are turned on and off and directed to the required locations between the inlet 112a and outlet 110a by mirrors 141.

As can be seen by the blown up section of FIG. 4, the combined movement of the optical unit 135 and mirrors 141 results in a progression/path of the spots 155 formed at an angle to the direction in which the optical unit 135 moves and at an angle to the direction in which the mirrors 141 move the laser spots 155. The speeds of the optical unit 135 and the mirrors 141 are selected such that, for a scan across the entire width of a scanning zone 140a-140g, the optical unit 135 is moved a sufficient distance forward such that when the spot is returned by the mirror 141 to a corresponding position in a direction lateral to the direction of movement of the optical unit 135, the spot 155b does not overlap with a previous position 155a. Each mirror 141 may be controlled to perform a simple repetitive motion to repeatedly scan the spot 155 across a width of the scanning zone 140 at a set speed, the laser beam being switched on and off to control which areas of the powder within the zone 140 are consolidated. In this way, "intelligent" control of the mirrors 141, where the movement of the mirrors 141 is controlled such that the spot follows a prescribed path corresponding to the areas to be consolidated may not be required.

Figure 12:
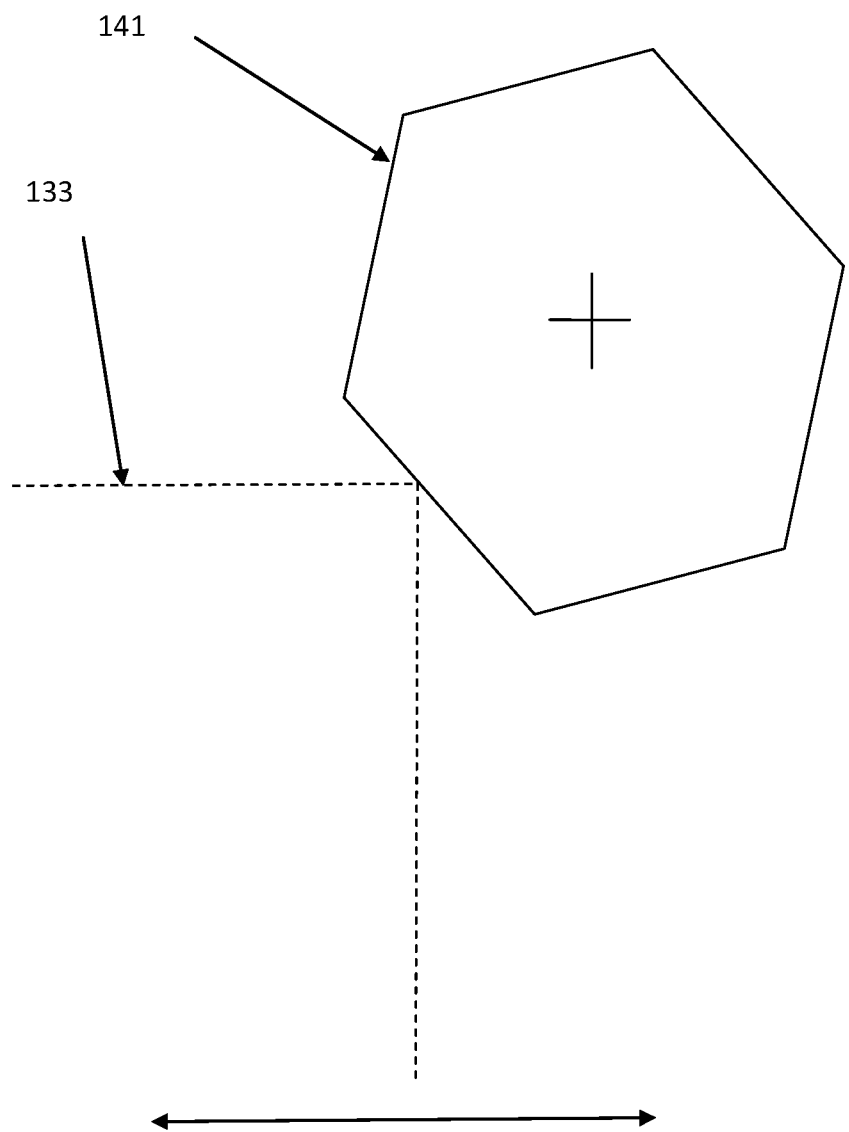
FIG. 12 shows a mirror according to one embodiment of the invention.

In one embodiment, shown in FIG. 12, the mirror 141, rather than being a flat plate that is rotated back and forth to deflect the laser spot along the required path, may be a regular polygon, in particular one of an order higher than four, such as a pentagon, hexagon, heptagon or octagon, that is rotated in only one direction and positioned relative to the incoming laser beam 133 such that the laser spot jumps from one side of the scanning zone to the other when the laser beam traverses a corner of the polygonal mirror 141.

In FIG. 4, adjacent scanning zones are scanned simultaneously. However, as shown in FIG. 5, it may be desirable in a single pass of the powder bed 104 by the optical unit 135 to only scan separated zones 140a-140g and to scan the gaps inbetween on one or more further passes of the optical unit across the powder bed 104.

Figure 5:
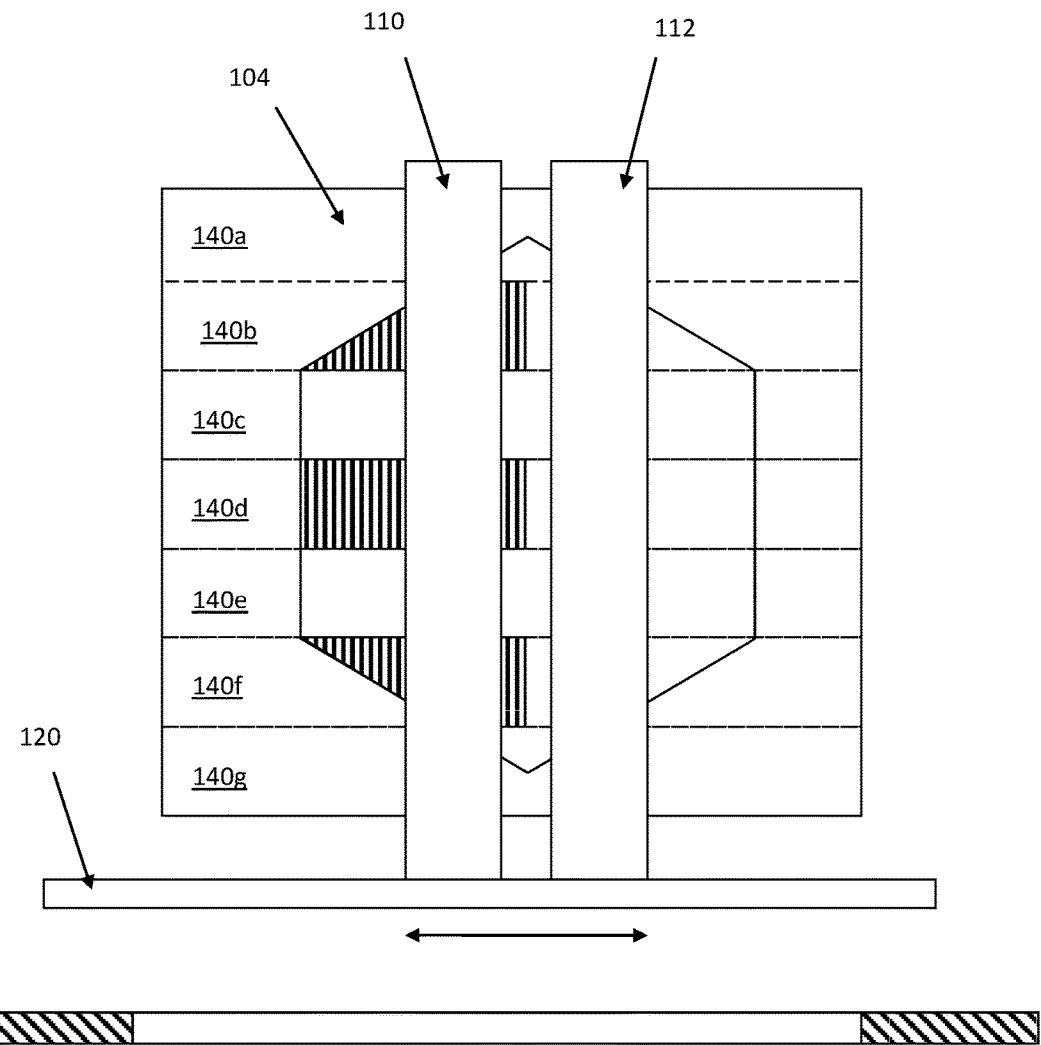
FIG. 5 is a plan view of an object being formed using multiple laser beams in accordance with another method of the invention.
Figure 6:
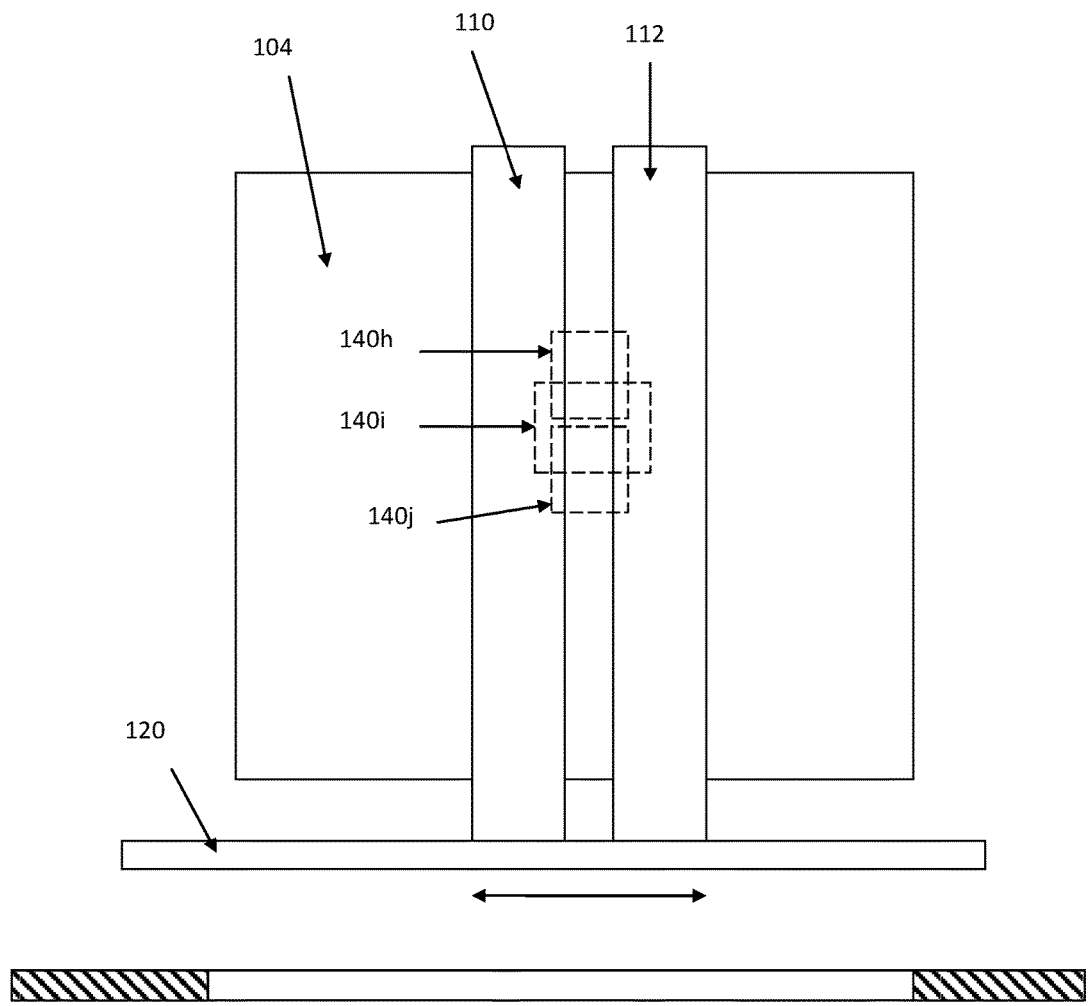
FIG. 6 shows schematically the regions that can be scanned by laser beams of one embodiment of the apparatus shown in FIGS. 1 to 3.
Figure 7A:
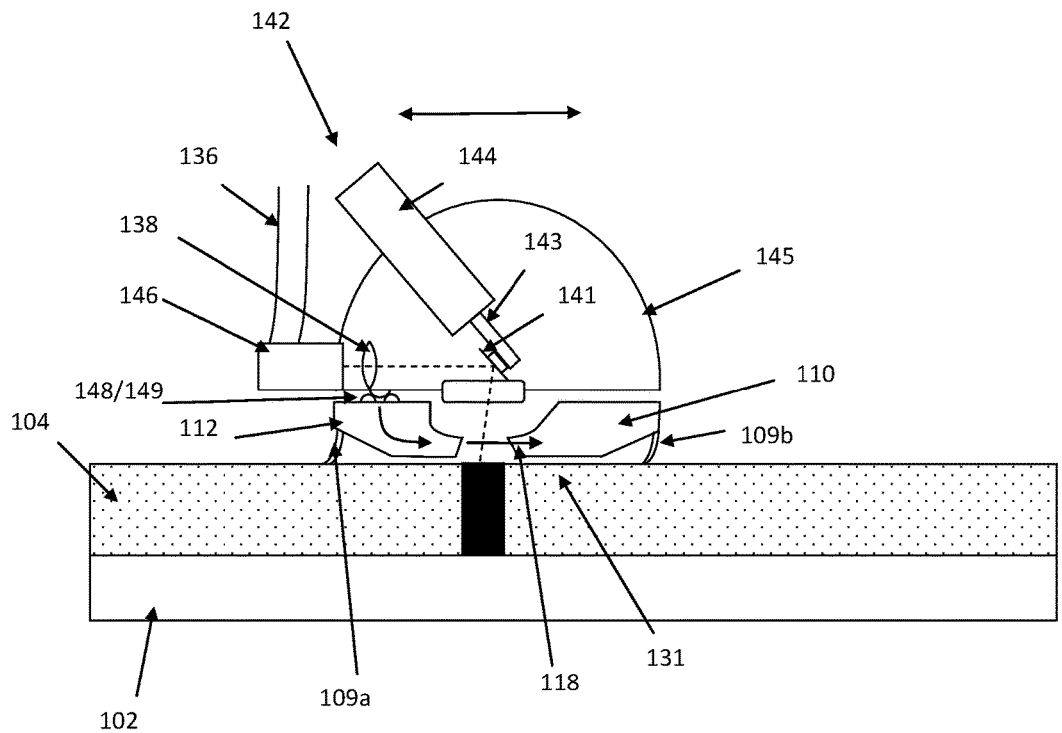
FIGS. 7*a* to 7*c* show a combined optical scanning unit and gas flow device according to one embodiment of the invention.
Figure 7B:
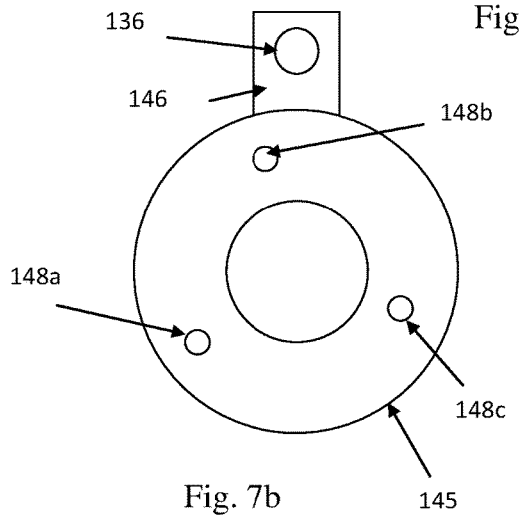
Figure 7C:
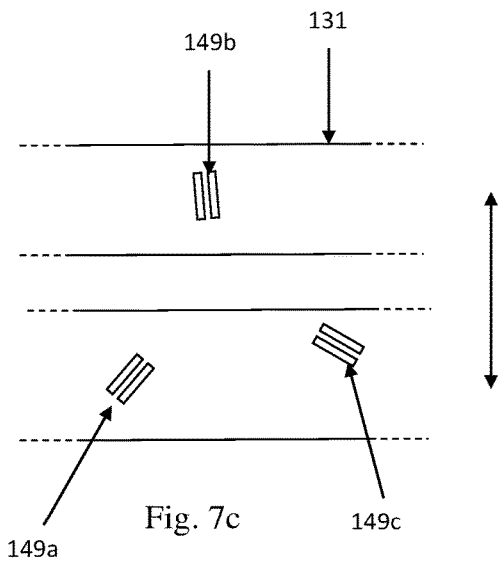
Figure 8:
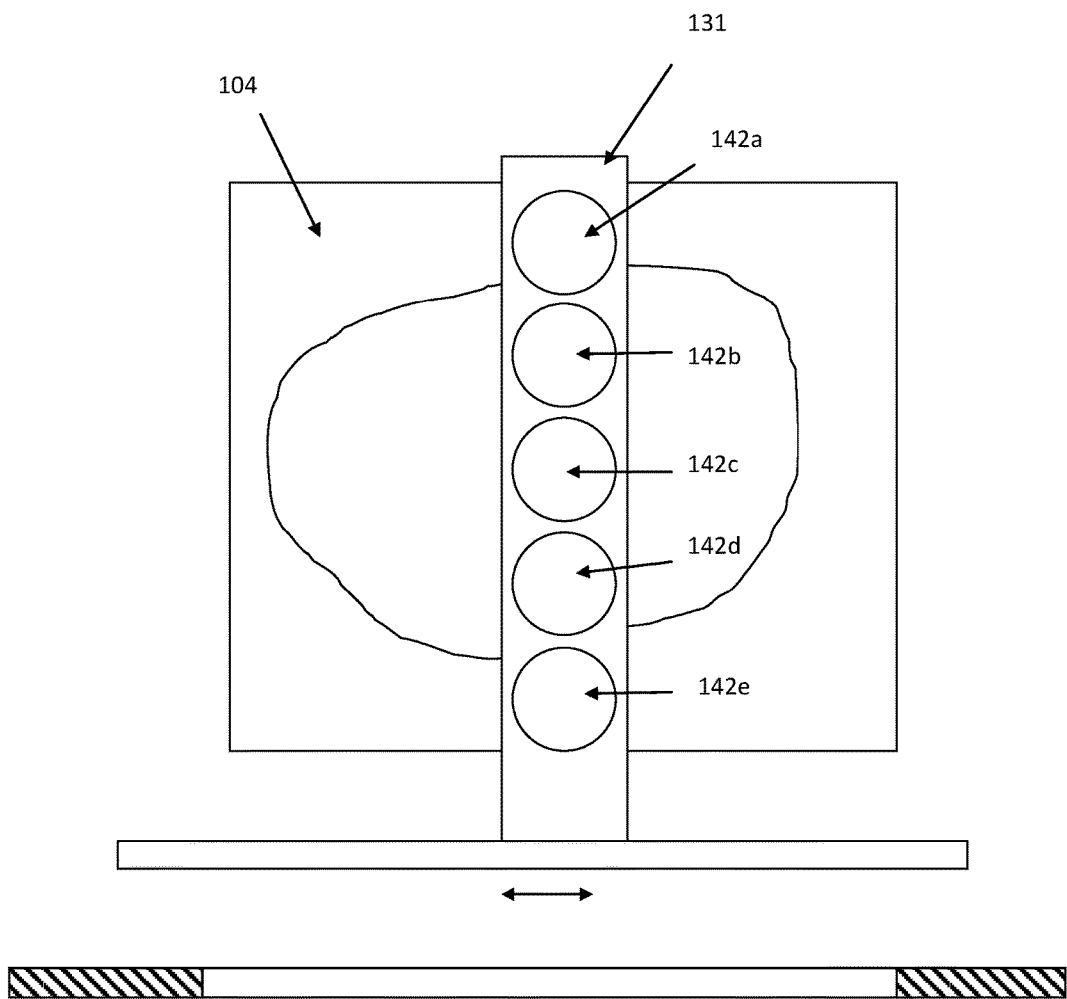
FIG. 8 is a plan view of the unit shown in FIGS. 7*a* to 7*c*.

The scanning zones 140a to 140g shown in FIGS. 4 and 5 may overlap in order that the powder consolidated in each zone can be knitted together to form a single object that extends across the zones 140a to 140g. In these overlapping regions, both laser beams consolidate portions of the object that fall within these regions. However, in an alternative embodiment, the scanning zones may overlap more than is necessary to knit the area consolidated in each scanning zone together. Such an arrangement is shown in FIG. 6, wherein scanning zones 140h to 140j overlap by a significant amount, such as each scanning zone overlapping at least a quarter of an adjacent scanning zone and preferably half of the adjacent scanning zone (in FIG. 4 the zones 140h to 140j are shown as having different lengths in the direction of movement of the optical unit 135 for clarity only and the extent that the optical assemblies can scan the laser beam in this direction is preferably the same for each assembly). In this way, areas of the powder to be consolidated that fall within these overlapping regions can be consolidated by either one of the laser beams associated with these scanning zones. Before or during a scanning operation the computer 130 selects which one of the laser beams to use to scan the area that falls within the overlapping region. The other laser beam is not used to scan this area, although at interfaces where one laser beam "hands-over" to another laser beam, areas of the powder may be consolidated by both laser beams in order to ensure that the separate areas of the object are knitted together.

In an alternative embodiment (not shown), rather than splitting a laser beam generated by a laser into multiple beams, each laser beam used for consolidating powder may be generated by a separate laser. Such an embodiment may not comprise splitters 134 or a heat dump. Furthermore, the lasers may be integrated into the optical unit 135.

FIGS. 7a to 7c and 8 show a further embodiment of an optical unit 135 and flow device 131. In this embodiment, the optical assemblies 142a to 142e are mounted on the flow device 131 so as to move therewith. Each optical assembly 142 comprises a sealed housing 145 containing a lens 139 for focusing the laser beam and an optical element, in this embodiment a mirror 141, for steering the laser beam onto the powder bed 104. The mirror 141 is mounted on a shaft 143 for rotation about an axis under the control of a motor 144. The housing comprises a connection 146 for connecting the housing to an optical fiber that carries the laser beam. Each optical assembly 142 is separately removably mountable onto the flow device 131. Accurate positioning of the optical assembly 142 onto the flow device 131 is achieved through provision of cooperating formations 148a to 148c and 149a to 149c on the housing 145 and the flow device 131, respectively. In this embodiment, the cooperating formations 148, 149 are a series of kinematic mounts that provide for repeatable positioning of the optical assembly 142 on the flow device 131. In this way, it may be possible to calibrate each optical assembly offline and, when an assembly requires replacement, simply remove the assembly from the flow device 131 and plug in a new assembly. In this way, each assembly is a "plug and play" module requiring limited interaction with the user to set-up the system.

This embodiment also differs from previous embodiments in that two wipers 109a and 109b are provided on the flow device 131. In this way, the flow device 131 can spread powder in both directions. In order to achieve this, powder dispensers may also be provided at either side of the powder bed 104.

It will be understood that, in another embodiment, the "plug and play" module design for the optical assemblies may be provided on a carriage separate from the flow device 131. Furthermore, rather than a movable flow device, the flow device may comprise inlet and outlet nozzles fixed either side of the powder bed 104.

Figure 9:
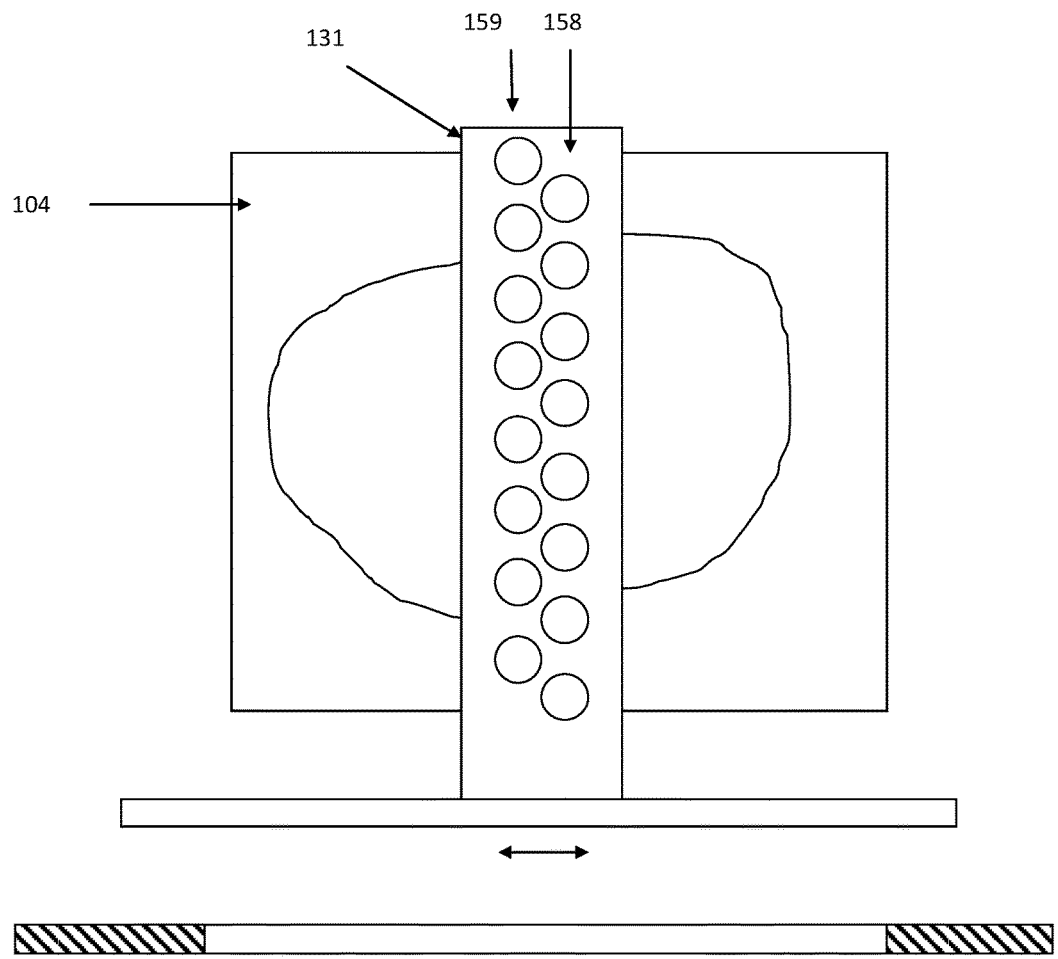
FIG. 9 is a schematic view of a scanning unit comprising arrays of horizontally offset optical assemblies for scanning laser beams across a working area of an additive manufacturing apparatus.

In a further embodiment, rather than a 1-dimensional array of laser beams, a two dimensional array of laser beams may be provided. In FIG. 9, a two dimensional array of laser beams is provided in a plane parallel to the powder bed 104. For example, the laser beams may be provided by a series of plug and play modules, as described above. In FIG. 9, a first column 158 of optical assemblies for directing the laser beams is offset from a second column 159 of optical assemblies. In this way, the width the scanning zones can be reduced to enable faster scanning.

Figure 10:
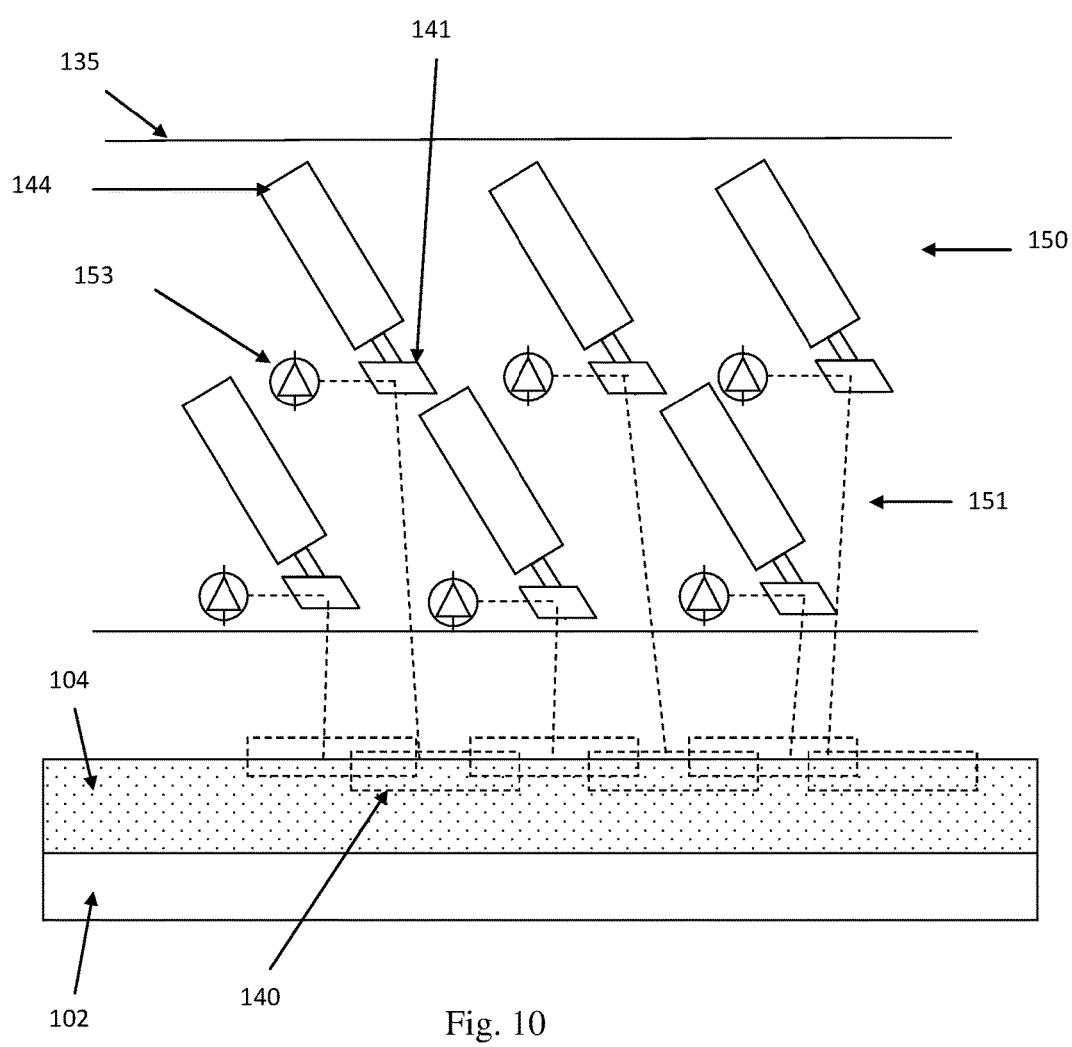
FIG. 10 is a schematic view of scanning unit comprising arrays of vertically offset optical assemblies for scanning laser beams across a working area of an additive manufacturing apparatus.

In FIG. 10, the laser beams are provided as a vertically stacked 2-dimensional array of optical assemblies, wherein the position of one row 150 of optical assemblies is offset from a position of a second row 151 of laser assemblies. Like the embodiment shown in FIG. 9, this may allow the width of the scanning zones to be reduced. However, the laser beams all scan along a common line perpendicular to the movement of the optical unit. This may allow a gap between a gas inlet and gas outlet (not shown) to be small.

In the optical unit 135 of FIG. 10, the laser beams are generated by laser diodes 153 integrated into the optical unit 135.

It will be understood that the arrays of FIGS. 9 and 10 may be combined to form a 3-dimensional array of optical assemblies.

Figure 11:
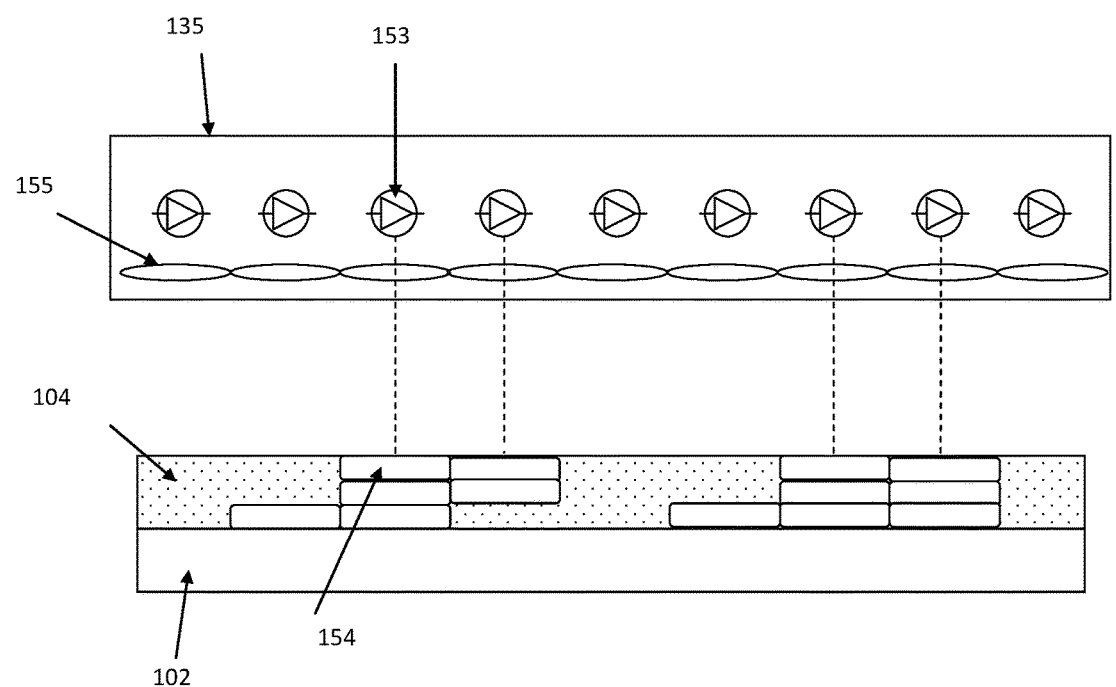
FIG. 11 is a schematic view of an optical unit according to another embodiment of the invention.

FIG. 11 shows another embodiment of the optical unit 135. In this embodiment, the laser diodes 153 are packed sufficiently close together with the laser beams focussed through microlenses 155 such that the adjacent beams are close enough together to provide melt pools 154 (which are typically larger than the $1/e^2$ laser spot diameter) that combine to form the object. Accordingly, in this embodiment, there is no steering optics. The laser diodes are switched on and off to melt the powder bed as required as the optical unit is moved across the powder bed.

Figure 13:
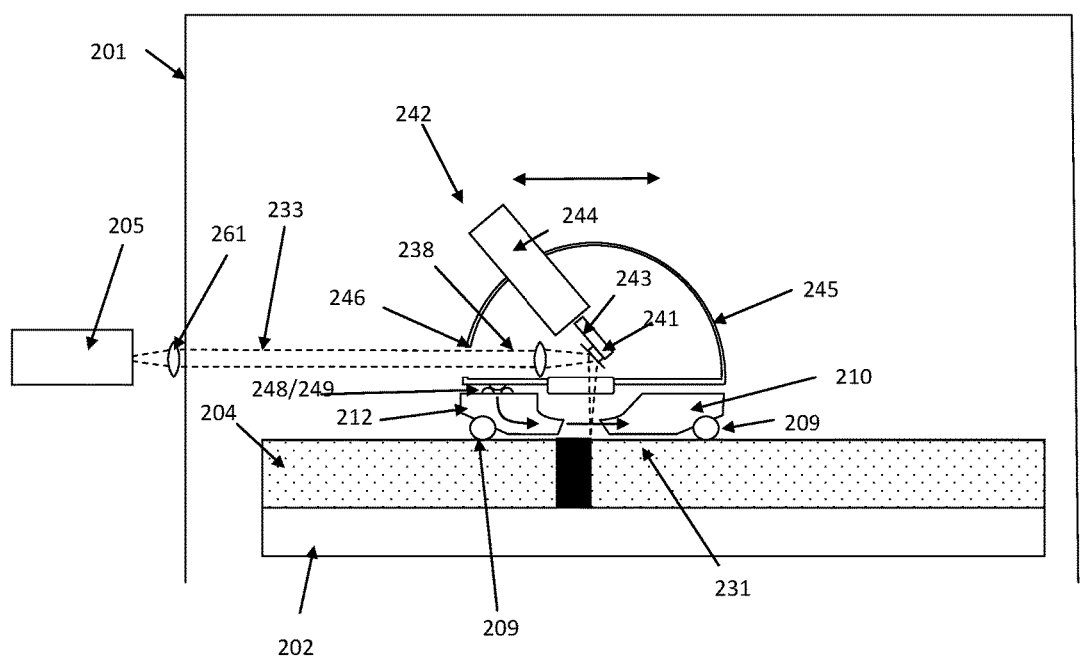
FIG. 13 shows additive manufacturing apparatus according to a further embodiment of the invention.

Referring to FIG. 13, apparatus according to a further embodiment of the invention is shown. This embodiment is similar to the embodiment shown in FIGS. 7a to 7c and FIG. 8 and features of the embodiment shown in FIG. 13 that are the same or similar to those shown in FIGS. 7a to 7c and FIG. 8 have been given the same reference numerals but in the series 200.

The embodiment shown in FIG. 13 differs from that shown in FIGS. 7a to 7c and FIG. 8 in that rather than each optical assembly/module 142 comprising a connection 146 for connecting an optical fibre to the optical module 142 for delivery of the laser beam, each optical module 242 has an opening 246 that is aligned to receive a different laser beam 233 delivered by laser modules 205 into the build chamber 201 from a side of the build chamber 201. An appropriate lens 261 may be used to collimate the laser beam 233 before it is delivered into the build chamber 201. The laser beams are delivered parallel to the linear movement of the scanning unit such that the openings 246 remain aligned with the laser beams 233 as the optical modules 242 are moved across the powder bed. In this embodiment, the wipers 209a, 209b are in the form of rollers.

Modifications and alterations may be made to the embodiments as described herein without departing from the scope of the invention. For example, the scanning unit may not extend across an entire width of the powder bed but may only extend across a partial width of the powder bed but be movable in two, perpendicular linear directions.

The invention claimed is:

1. An additive manufacturing apparatus for building an object by layerwise consolidation of material, the apparatus comprising:
   a build chamber containing a working area;
   an optical unit configured to control transmission of a plurality of laser beams onto material in the working area for consolidating the material deposited in layers, the optical unit arranged to move over the working area and comprising a plurality of optical elements, each optical element movable in the optical unit for scanning a corresponding laser beam of the plurality of laser beams across the material in the working area; and
   a control unit configured to control scanning of the corresponding laser beam along a path across the working area by controlling (i) movement of the optical unit over the working area so that the corresponding laser beam moves in a first direction, and (ii) movement of the optical elements in the optical unit, simultaneously with the movement of the optical unit over the working area, so that the corresponding laser beam moves in a second direction, transverse to the first direction, the path of the corresponding laser beam being a combination of movement of the corresponding laser beam in the first direction and the second direction.

2. The additive manufacturing apparatus according to claim 1, wherein the optical unit is arranged to move over the working area along a linear axis, and each optical element is arranged to steer the at least one laser beam onto material in the working area in a direction transverse to the linear axis.

3. The manufacturing apparatus according to claim 2, wherein the transverse direction is perpendicular to the linear axis.

4. The additive manufacturing apparatus according to claim 1, wherein each optical element is arranged to steer the corresponding laser beam in only one-dimension.

5. The additive manufacturing apparatus according to claim 1, wherein each optical element is arranged such that movement of the optical element can move a spot of the corresponding laser beam across the working surface faster than the spot can be moved across the working surface by moving the optical unit.

6. The additive manufacturing apparatus according to claim 1, wherein the plurality of optical elements are arranged to direct the laser beams such that, for a position of the optical unit relative to the working area, an entire width of the working area can be scanned by steering the laser beams with the optical elements.

7. The additive manufacturing apparatus according to claim 1, wherein each optical element is mounted to rotate about a rotational axis, the rotational axes fixed relative to each other and the optical unit, and for a position of the optical unit relative to the working area, an entire width of the working area can be scanned by steering the laser beams by rotation of the optical elements.

8. The additive manufacturing apparatus according to claim 1, wherein the optical unit comprises at least one laser for generating at least one of the laser beams, the laser movable with the optical unit.

9. The additive manufacturing apparatus according to claim 1, wherein each optical element is removably mounted on the optical unit such that the optical element can be removed from the optical unit separately from another one of the optical elements.

10. The additive manufacturing apparatus according to claim 9, wherein each optical element is removably mounted on the optical unit using a kinematic mount.

11. The additive manufacturing apparatus according to claim 1, wherein the control unit is configured to control the movement of the optical unit and the optical elements such that each corresponding laser beam is scanned over the working area along scan paths that are at an angle to a direction in which an optical module moves over the working area.

12. An additive manufacturing apparatus for building an object by layerwise consolidation of material, the apparatus comprising:
a build chamber containing a working area;
an optical unit configured to control transmission of a plurality of laser beams onto material in the working area for consolidating the material deposited in layers, the optical unit arranged to move over the working area and comprising a plurality of independently controllable optical elements, each optical element for steering a corresponding laser beam of the plurality of laser beams onto the material in the working area, wherein a scanning zone for each optical element is defined by a zone over which the corresponding laser beam can be directed by the independent movement of the optical element, the optical elements arranged in the optical unit such that, for a position of the optical unit, the scanning zones for at least two of the optical elements overlap; and
a control unit configured to select a single one of the at least two optical elements to use to form an area of the object located within a region in which the scanning zones overlap.

13. An additive manufacturing apparatus for building an object by layerwise consolidation of material, the apparatus comprising:
a build chamber containing a working area;
an optical unit configured to control transmission of a plurality of laser beams onto material in the working area for consolidating the material deposited in layers, the optical unit arranged to move over the working area and comprising a plurality of independently controllable optical elements, each optical element for controlling transmission of a corresponding laser beam of the plurality of laser beams onto the material in the working area; and
a gas flow device configured to generate a gas flow across a part of the working area, and the gas flow device configured to be movable across the working area simultaneously with the optical unit such that the laser beams are directed to the part of the working area across which the gas flow is generated.

14. The additive manufacturing apparatus according to claim 13, comprising:
a wiper for spreading material across the working area, the wiper connected to the optical unit such that the optical unit and the wiper move across the working area as a single unit.

15. The additive manufacturing apparatus according to claim 13, wherein the gas flow device comprises at least a gas exhaust for drawing in gas from an atmosphere in the build chamber above the working area.

16. The additive manufacturing apparatus according to claim 13, wherein the gas flow device comprises a gas nozzle and a gas exhaust configured such that gas flow from the gas nozzle to the gas exhaust is across the working area.

17. The additive manufacturing apparatus according to claim 16, wherein each optical element is configured to transmit the corresponding laser beam to a location on the working area between the gas nozzle and gas exhaust.

18. The additive manufacturing apparatus according to claim 13, wherein the gas flow device is configured to generate a laminar gas flow parallel to the working area.

19. The additive manufacturing apparatus according to claim 13, wherein the optical unit is connected with the gas flow device such that the optical unit and the gas flow device move across the working area as a single unit.

20. The additive manufacturing apparatus according to claim 13, wherein the gas flow device is further configured to move with the optical unit.

21. The additive manufacturing apparatus according to claim 13, wherein the optical unit is mounted on the gas flow device.

22. An additive manufacturing apparatus for building an object by layerwise consolidation of material, the apparatus comprising:
a build chamber containing a working area;
an optical unit configured to control transmission of a plurality of laser beams onto material in the working area for consolidating the material deposited in layers, the optical unit arranged to move over the working area and comprising a plurality of independently controllable optical elements, each optical element for controlling transmission of a corresponding laser beam of the plurality of laser beams onto the material in the working area, wherein
the optical unit comprises a two-dimensional array of the optical elements, and
the two-dimensional array of optical elements comprises first and second rows of the optical elements, each optical module of the first row configured to transmit the corresponding laser beam to a corresponding first region of the working area and each optical module of the second row configured to transmit the corresponding laser beam to a corresponding second region of the working area, the second row located above the first row in a direction substantially perpendicular to the working plane and staggered with respect to the first row such that the first regions are located adjacent to and interspersed with the second regions to provide a continuum of the first and second regions across the working area.

23. The additive manufacturing apparatus according to claim 22, wherein the first and second regions overlap in the working area.

* * * * *